(12) United States Patent
Calinov et al.

(10) Patent No.: US 7,606,915 B1
(45) Date of Patent: Oct. 20, 2009

(54) PREVENTION OF UNAUTHORIZED SCRIPTS (75) Inventors: Iulian D. Calinov, Redmond, WA (US);
Danpo Zhang, Issaquah, WA (US);
Jonathan Wilkins, Seattle, WA (US);
Julien Couvreur, Kirkland, WA (US);
Josh Benaloh, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 812 days.

(21) Appl. No.: 10/374,036

(22) Filed: Feb. 25, 2003

(51) Int. Cl.
*G06F 15/16* (2006.01)
*G06F 7/04* (2006.01)

(52) U.S. Cl. .......................... 709/229; 726/2
(58) Field of Classification Search ................. 709/229; 726/2–7, 14, 17, 21, 27
See application file for complete search history.

(56) References Cited

U.S. PATENT DOCUMENTS

| 5,491,749 | A | 2/1996 | Rogaway | |
|---|---|---|---|---|
| 6,195,698 | B1* | 2/2001 | Lillibridge et al. | 709/225 |
| 6,687,401 | B2 | 2/2004 | Naoi et al. | |
| 6,944,765 | B1* | 9/2005 | Rose et al. | 713/181 |
| 7,197,639 | B1* | 3/2007 | Juels et al. | 713/168 |
| 2002/0032869 | A1 | 3/2002 | Lamberton et al. | |
| 2002/0194501 | A1 | 12/2002 | Wenocur et al. | |
| 2003/0093699 | A1 | 5/2003 | Banning et al. | |
| 2004/0030934 | A1 | 2/2004 | Mizoguchi et al. | |
| 2004/0093371 | A1 | 5/2004 | Burrows et al. | |
| 2004/0123160 | A1 | 6/2004 | Mizrah | |
| 2005/0027990 | A1 | 2/2005 | Ogawa | |
| 2005/0216771 | A1 | 9/2005 | Malcolm | |

OTHER PUBLICATIONS

D. Lopresti, C. Shih, and G. Kochanski, "Human interactive proofs for spoken language interfaces," in Proc. of the Workshop on Human Interactive Proofs, Palo Alto, CA,. Jan. 2002.*
Baird et al., "Human Interactive Proofs and Document Image Analysis," Proceedings of the 5th IAPR International Workshop on Document Analysis Systems, Aug. 2002, 7 pages, Princeton, NJ, U.S.A.
Blank, "A Practical Turing Test for Detecting Adbots," AI Update, Winter 2001, pp. 6-7, U.S.A.
Pinkas et al., "Securing Passwords Against Dictionary Attacks," Nov. 18-22, 2002, pp. 161-170, ACM Press, New York, U.S.A.

(Continued)

*Primary Examiner*—Yemane Mesfin
(74) *Attorney, Agent, or Firm*—Senniger Powers LLP (57) ABSTRACT

Methods and system of preventing unauthorized scripting. The invention includes providing one or more tests to a user for distinguishing the user from a machine when the user requests access to the server. By storing information on a correct solution to the test in a block of data and sending the block of data together with the test, the invention provides stateless operation. Moreover, maintaining a database of previously used correct responses prevents replay attacks. The invention also includes providing combinations of alternative tests, such as visually altered textual character strings, audible character strings, and computational puzzles. Other aspects of the invention are directed to computer-readable media for use with the methods and system.

60 Claims, 8 Drawing Sheets

OTHER PUBLICATIONS

Lin et al., "Three-party Encrypted Key Exchange; Attacks and A Solution," ACM Operating Systems Review, Oct. 2000, pp. 12-20.

Matsumoto, "Human-Computer Cryptography: An Attempt," 1996, pp. 68-75, ACM Press, New York, U.S.A.

Monrose et al., "Authentication via Keystroke Dynamics," 1997, pp. 48-56, ACM Press, New York, U.S.A.

Deriche, R., Fast Algorithms for Low-Levil Vision, Jan. 1990, IEEE Transactions on Pattern Analysis and Machine Intelligence, vol. 12. No. 1, pp. 78-87, IEEE Computer Society, U.S.A.

Simard et al., "Transformation Invariance in Pattern Recognition—Tangent Distance and Tangent Propagation," In Neural Networks: Tricks of the Trade, Chapter 12, 1998, 40 pages, Springer, U.S.A.

Turing, "Mind A Quarterly Review of Psychology and Philosophy," vol. LIX, No. 236, Oct. 1950, pp. 433-460, Oxford University Press, U.S.A.

Ahn et al., "Telling Humans and Computers Apart (Automatically) or How Lazy Cryptographers do AI," pp. 1-11, Pennsylvania, U.S.A. Workshop on Human Interactive Proofs, Jan. 9-11, 2002, California, U.S.A.

LeCun et al., "Gradient-Based Learning Applied to Document Recognition," Proceedings of the IEEE, 1998, pp. 1-46, U.S.A.

Bengio et al., "LeRec: A NN/HMM Hybrid for On-Line Handwriting Recognition," Neural Computation, vol. 7, No. 5, 1995, pp. 1-14, U.S.A.

Levin et al., "Dynamic Planar Warping for Optical Character Recognition," IEEE International Conference on Acoustics, Speech, and Signal Processing, vol. 3, Mar. 23-26, 1992, pp. III-149-III-152, U.S.A.

Viola et al., "Rapid Object Detection Using a Boosted Cascade of Simple Features," Accepted Conference on Computer Vision and Pattern Recognition, 2001, pp. 1-9, U.S.A.

Wolberg, "Digital Image Warping," IEEE Computer Society Press, 1990, California, U.S.A.

Spice, "Robot Solves Internet Robot Problem," Pittsburgh Post-Gazette, Oct. 21, 2001, 2 pages, Pennsylvania, U.S.A.

Pinkas, et al., "Securing Passwords Against Dictionary Attacks," Proceedings of the 9th ACM Conference on Computer and Communications Security, 2002, pp. 161-170, ACM Press, New York, U.S.A.

* cited by examiner

TYPE THE CHARACTERS FROM THE REGISTRATION PICTURE
CLICK XXX BELOW. WE WILL OPEN YOUR COMPUTER'S DEFAULT AUDIO PROGRAM AND PLAY A SET OF CHARACTERS. TYPE THE CHARACTERS THAT YOU HEAR. THE CHARACTERS AREN'T CASE-SENSITIVE. WHY DO I NEED TO TYPE CHARACTERS FROM A PICTURE TO REGISTER?

NOTE TO LISTEN AGAIN, IN YOUR AUDIO PROGRAM, CLICK PLAY. IF YOU CLICK XXX BELOW AGAIN, WE WILL PLAY A NEW SET OF CHARACTERS.

PLAY AUDIO CHARACTERS [            ]

☐ I CAN'T HEAR THE CHARACTERS; LET ME REGISTER USING A DELAYED COMPUTATION.

[CONTINUE] [CANCEL]

HELP

FIG. 4

HELP

REGISTER USING A DELAYED COMPUTATION

IF YOU ARE UNABLE TO SEE OR HEAR THE CHARACTERS IN THE PICTURE, YOU CAN DOWNLOAD A COMPUTATION THAT WILL AUTOMATICALLY RUN ON YOUR COMPUTER. THE COMPUTATION CAN PREVENT OR DELAY HARMFUL PROGRAMS THAT ATTACKERS USE TO REGISTER MULTIPLE ACCOUNTS (OFTEN TO SEND JUNK E-MAIL MESSAGES).

TO CONTINUE, YOU NEED TO:

- DOWNLOAD A SOFTWARE COMPONENT CONTROL. MAKE SURE THAT YOUR BROWSER SUPPORTS THIS CONTROL (TO LEARN MORE, SEE HELP IN YOUR BROWSER). WHAT IS A SOFTWARE COMPONENT CONTROL?
- ALLOW THE CONTROL TO COMPLETE THE COMPUTATION. DEPENDING ON YOUR COMPUTER, THIS OPERATION MAY TAKE SEVERAL MINUTES UP TO AN HOUR. YOU MAY BE UNABLE TO USE YOUR COMPUTER DURING THAT TIME.

☐ I UNDERSTAND THAT DOWNLOADING AND COMPLETING THE COMPUTATION REQUIRES A WAITING PERIOD, AND THAT INTERRUPTING THE PROCESS CANCELS REGISTRATION.

[CONTINUE] [CANCEL]

FIG. 5

HELP

THE CONTROL IS PERFORMING THE COMPUTATION

WHEN THE COMPUTATION IS COMPLETE. WE WILL NOTIFY YOU, AND YOU'LL BE ABLE TO SIGN IN TO PARTICIPATING SITES USING YOUR CREDENTIALS.
YOU MAY BE UNABLE TO USE YOUR COMPUTER UNTIL THE COMPUTATION IS COMPLETE.

PERFORMING THE COMPUTATION:
||||||||||||||||||||||||||||||||

[CANCEL]

PREVENTION OF UNAUTHORIZED SCRIPTS

TECHNICAL FIELD

The present invention relates to the field of computer network environments. In particular, this invention relates to improvements in preventing scripts from running tasks that are supposed to be performed by humans for improving spam prevention and the like in such computer network environments.

BACKGROUND OF THE INVENTION

Web sites, or Internet sites, very often provide information, products, services, and the like to their users. A malicious user will sometimes employ a script to emulate human interaction with a web site. As is well known in the art, a script is an automated set of instructions. Every time the script is invoked, the commands are interpreted and executed. The script can adapt itself to the responses that the server gives.

Many web sites require users to "register" before their web servers will grant access to the users. Web site registration is one example of a task that is supposed to be performed by a human rather than a machine (i.e., by scripting). During registration, a user typically supplies personal information such as username, password, account number, address, telephone number, e-mail address, computer platform, age, gender, and/or hobbies to the registering web site. The registration information may be necessary to complete transactions (e.g., commercial or financial transactions). Typically, the information also permits the web site to contact the user directly (e.g., via electronic mail) to announce, for example, special promotions, new products, or new web site features. Additionally, web sites often collect user information so web site operators can better target future marketing activities or adjust the content provided by the sites.

When registering a user for the first time, a web site typically requests that the user select a login identifier, or login ID, and an associated password. The login ID allows the web site to identify the user and retrieve information about the user during subsequent user visits to the web site. Generally, the login ID must be unique to the web site such that no two users have the same login ID. The combination of the login ID and password associated with the login ID allows the web site to authenticate the user during subsequent visits to the web site. The password also prevents others (who do not know the password) from accessing the web site using the user's login ID. This password protection is particularly important if the web site stores private or confidential information about the user, such as financial information or medical records.

Using a presently available multi-site user authentication system (e.g., Microsoft®.NET™ Passport single sign-in service), a web user can maintain a single login ID (and associated password) for accessing multiple, affiliated web servers or services. Such a system permits the user to establish a unique account identified by, for example, an e-mail address.

Unfortunately, scripting permits a malicious user to emulate human interaction with a web site for registering a large number of new accounts associated with fictitious users. Because many e-mail services allow users to filter out unsolicited mass mailings (i.e., spam) based on the sender's address, running scripts to register new e-mail accounts enables the malicious user to continue sending spam from the new accounts in the face of such filtering. The new e-mail accounts also provide readily accessible space for storing illegal copies of software. Malicious users also run scripts against pages served by web servers in an attempt to guess passwords and mass-harvest public information (e.g., e-mail addresses). Moreover, malicious users are able to obtain free advertising in chat rooms and the like through the use of such script attacks.

Although several conventional techniques purport to prevent spam, these known techniques fail to address the problem of scripting attacks. For example, one anti-spam method, briefly mentioned above, attempts to distinguish desirable e-mail from spam by applying a set of rules to classify each piece of mail (e.g., flagging mail from a particular sender as spam). Rule-based classifiers tend to be ineffective mail filters and require continually modifying the rules. Another anti-spam technique involves requiring the sender to work a puzzle, the solution of which is attached to his or her sent mail as an "electronic postage stamp." In this instance, the recipient's mailbox must be set up to only accept mail that includes such a stamp. Other systems require generating digital signatures and the like for e-mail.

Those skilled in the art are familiar with the concept of "Turing tests" for interrogating two unseen respondents, a human and a computer, to try to determine which of the two is the computer. CAPTCHA (Completely Automated Public Turing test to tell Computers and Humans Apart) is a well known project that creates puzzles designed to be solvable only by humans for the purpose of distinguishing humans and computers over a network. Typically, the puzzles involve having the user read a sequence of characters from a visually cluttered image. Further information on CAPTCHA is available at www.captcha.net.

In light of the foregoing, further improvements are needed for preventing script attacks from successfully running a repetitive task that is supposed to be performed by a human. In addition to providing significant cost savings and improved security, such a solution is useful in helping prevent spam, software piracy, and other malicious attacks.

SUMMARY OF THE INVENTION

The invention meets the above needs and overcomes one or more deficiencies in the prior art by providing improved script prevention. In other words, the invention prevents a script from successfully running a repetitive task that is supposed to be performed by a human.

In one embodiment, the invention utilizes an altered image or sound that is difficult for a computer to reliably read without application of expensive techniques but that can be easily understood by a human. By including such an image or sound as a challenge in a web page and making the submission of the page dependent on a correct answer to the challenge, the invention denies a script running against the web page. Moreover, encoding the answer to the challenge within the web form that is returned with the response to the challenge permits essentially stateless operation. The server issuing the challenge can be different from the server that evaluates the correctness of the response. This aspect of the invention stifles replay attacks by a malicious user even if the challenges are pre-computed and re-used.

The invention also contemplates providing an alternative computational puzzle challenge in the event the image or sound challenge is not appropriate.

The invention yields significant reductions in spam, software piracy, and operating costs and yields significant improvements in security. The cost savings are particularly significant for large-scale web services, such as web-based e-mail services. Moreover, the features of the present invention described herein are less laborious and easier to implement than currently available techniques as well as being economically feasible and commercially practical.

Briefly described, a method embodying aspects of the invention prevents automated access to a service provided by a server coupled to a data communication network. The method includes delivering a first test to a client coupled to the data communication network for rendering to a user when the user requests access to the service via the client. The method also includes delivering a second test to the client as an alternative to the first test. The first and second tests each require a different response from the user to verify the user. Further, the method includes receiving a response to at least one of the tests from the user via the client and granting access to the service via the client if the received response verifies the user.

In another embodiment, a method of the invention conducts a Turing test on a user requesting access to a service. The method includes delivering a human-readable textual string of characters to the client for rendering to the user and requesting that the user respond to the textual string of characters by repeating the string of characters to distinguish the user from a computer. In this instance, the textual string of characters is visually altered to inhibit computerized character recognition. The method also includes delivering an alternative test for rendering to the user and requesting that the user respond to the alternative test to also distinguish the user from a computer. The alternative test requires a different response from the user than the repeated textual string of characters. Further, the method includes receiving a response from the user to either the textual string of characters or the alternative test.

Another method embodying aspects of the invention prevents automated access to a service. The method includes delivering a challenge to a client coupled to the data communication network for rendering to a user when the user requests access to the service via the network. The method also includes requesting that the user respond to the challenge and storing information representative of one or more previously used challenges. According to the method, the response received from the user via the client is compared to the stored information. Further, the method includes granting access to the service via the client if the received response is a valid solution to the challenge rendered to the user unless the received response corresponds to the stored information.

Yet another embodiment of the invention is directed to a method of preventing automated attacks against a server coupled to a data communication network. The method includes delivering a test for distinguishing a user from a machine. The test is delivered to a client coupled to the data communication network for rendering to the user when the user requests access to the server via the client. The method further includes storing a correct solution to the test in a block of data and sending the block of data to the client together with the test. The client returns the block of data with a response to the test from the user. The method of the invention also sets forth receiving the response and the block of data via the client, comparing the correct solution in the block of data to the received response, and granting access to the server via the client if the received response matches the correct solution. In one embodiment, the block of data is encrypted.

In another embodiment, a computer-readable medium stores a data structure having at least first and second fields. The first field contains information representative of a client response to a test. In this instance, the test was rendered to a client for identifying an unauthorized script in response to the client requesting access to a service. The second field contains information representative of a correct solution to the test for validating the client response. The client is granted access to the service if the client response is validated by the correct solution.

A system embodying aspects of the invention prevents unauthorized access to a service provided via a data communication network. The system includes first and second servers coupled to the network. The first server delivers a challenge to a client also coupled to the network when the client requests access to the service. The first server also sends a block of data to the client together with the challenge. The block of data contains information representative of a correct solution to the challenge. The second server receives a response to the challenge from the client as well as the block of data via the client. Based on the received block of data, the second server determines whether the received response is valid before granting access by the client.

Computer-readable media having computer-executable instructions for performing methods of sharing information embody further aspects of the invention.

Alternatively, the invention may comprise various other methods and apparatuses.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION OF THE INVENTION

Figure 1:
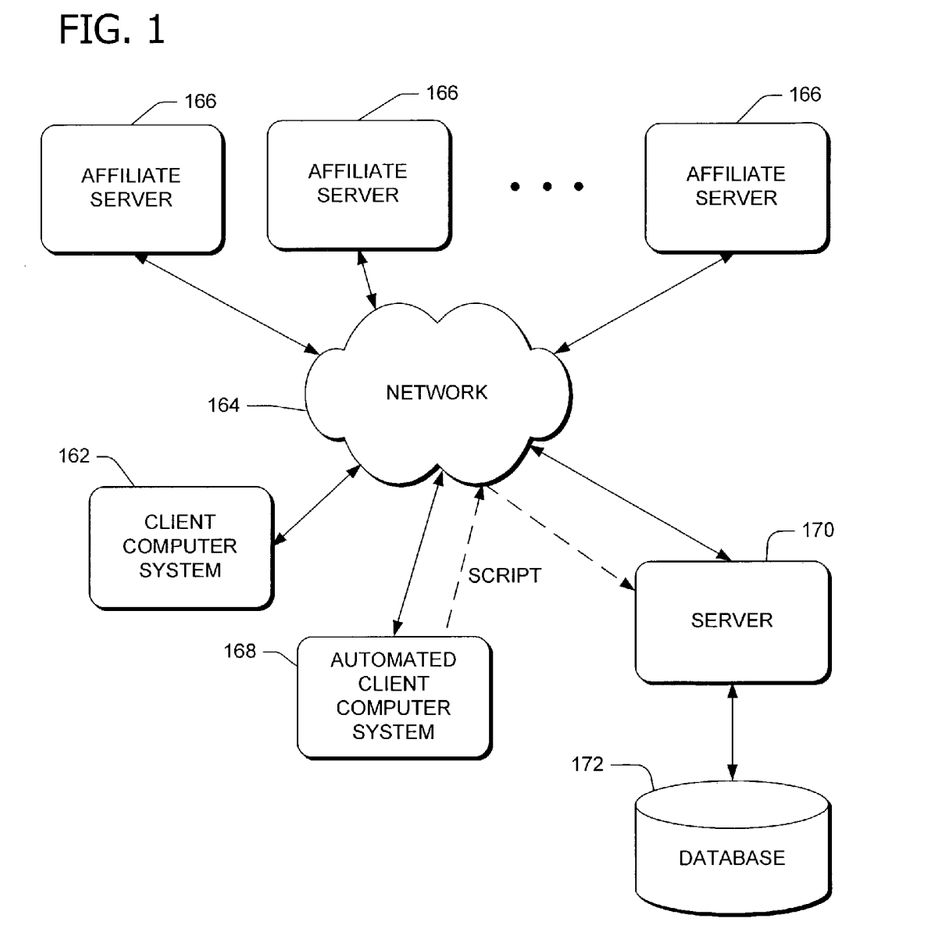
FIG. 1 is a block diagram illustrating a network environment in which the present invention is utilized according to one embodiment of the invention.

Referring now to the drawings, FIG. 1 illustrates an exemplary network environment in which the present invention may be utilized to render script attacks ineffective for performing repetitive tasks that are supposed to be performed by humans. In this instance, FIG. 1 diagrammatically shows cross-internet collaboration between web sites as part of a distributed, multi-site user authentication system (e.g., Microsoft®.NET™ Passport sign on service). Such services provide a user with the ability to access one or more participating Web sites or resources with a single sign-in. Although the participating sites (referred to as "affiliates" or "affiliate sites") maintain control over permissions, they use the authentication service rather than hosting and maintaining their own proprietary authentication systems. In the example of FIG. 1, the invention is described in the context of preventing automated registration with the multi-site user authentication system. It is to be understood, however, that the invention is applicable in any environment in which a user seeks access to a network server.

One or more client computer systems 162 are coupled to a data communication network 164 in FIG. 1. In this example, the network 164 is the Internet (or the World Wide Web). However, the teachings of the present invention can be applied to any data communication network. Multiple affiliate servers 166 are also coupled to network 164. In turn, the client computer systems 162 can access the affiliate servers 166 via network 164. Affiliate servers 166 are also referred to as "web servers" or "network servers."

FIG. 1 also illustrates an unauthorized user at client computer system 168. Most web sites are designed to interact with humans. However, human interaction with a web site can be very easily emulated with the use of scripting by an unauthorized user. A server has no reliable way of knowing when it interacts with a human versus a machine. Malicious users, for example, such as the one at client computer 168, run scripts against pages served by web servers for a variety of purposes (e.g., registering many new accounts to fictitious users, attempting to guess passwords, mass harvesting of public information such as e-mail addresses, abusing mail services for spam, free advertising in chat rooms, and the like).

Prior to executing an authentication process, both the user of client computer system 162 and the operator(s) of affiliate servers 166 "register" with a server 170 (e.g., an authentication server). The server 170, also coupled to network 164, allows communication between itself and client computer systems 162 and web servers 166. In this example, the unauthorized user, represented by client computer system 168, attempts to run a script to automatically register a large number of accounts with server 170. In general, this registration is a one-time process that provides necessary information to server 170. The user of client computer system 162 registers with server 170 by providing information about the user and/or client computer system 162, such as, the user's name, mailing address, and e-mail address (see FIG. 2). As part of the user registration process, the user is assigned (or selects) a login ID, which is a common login ID, used to access any affiliate server (e.g., server 166). The login ID may also be referred to herein as a "username," "member name," or "login name".

Additionally, the user selects a password associated with the login ID that is used for authentication purposes. After registering and logging into server 170, the user can visit any affiliate server 166 (i.e., affiliate servers that are also registered with the same authentication server) without requiring any additional authentication and often without re-entering user information that is already contained in the associated user profile.

As shown in FIG. 1, a database 172 (e.g., an authentication database) is coupled to server 170. The database 172 contains, for example, information (i.e., credentials) necessary to authenticate a user of one of the client computer systems 162 (as well as other users on the network).

Although referred to as an "authentication server," server 170 in the illustrated embodiment is also a web server capable of interacting with web browsers and other web servers. In this example, server 170, client computer systems 162, and web servers 166 communicate data among themselves using the hypertext transfer protocol (HTTP), a protocol commonly used on the Internet to exchange information. Although the database 172 is shown as a single storage unit separate from server 170, it is to be understood that in other embodiments of the invention, database 172 may be one or more memories contained within or separate from server 170. In a federated environment, for example, a plurality of authentication servers such as server 170 may be used to provide authentication.

The present invention involves the use of challenges (also referred to as "tests"), including altered images or sounds, for script prevention in certain areas of operations in a web site. An appropriately altered image, or sound, may be easily understood by humans but can be very difficult for a computer to reliably read without application of expensive techniques. By including such an image or sound as a challenge in a web page and making the submission of the page dependent on a correct answer to the challenge, the invention reasonably deters scripts from running against web pages.

Figure 2:
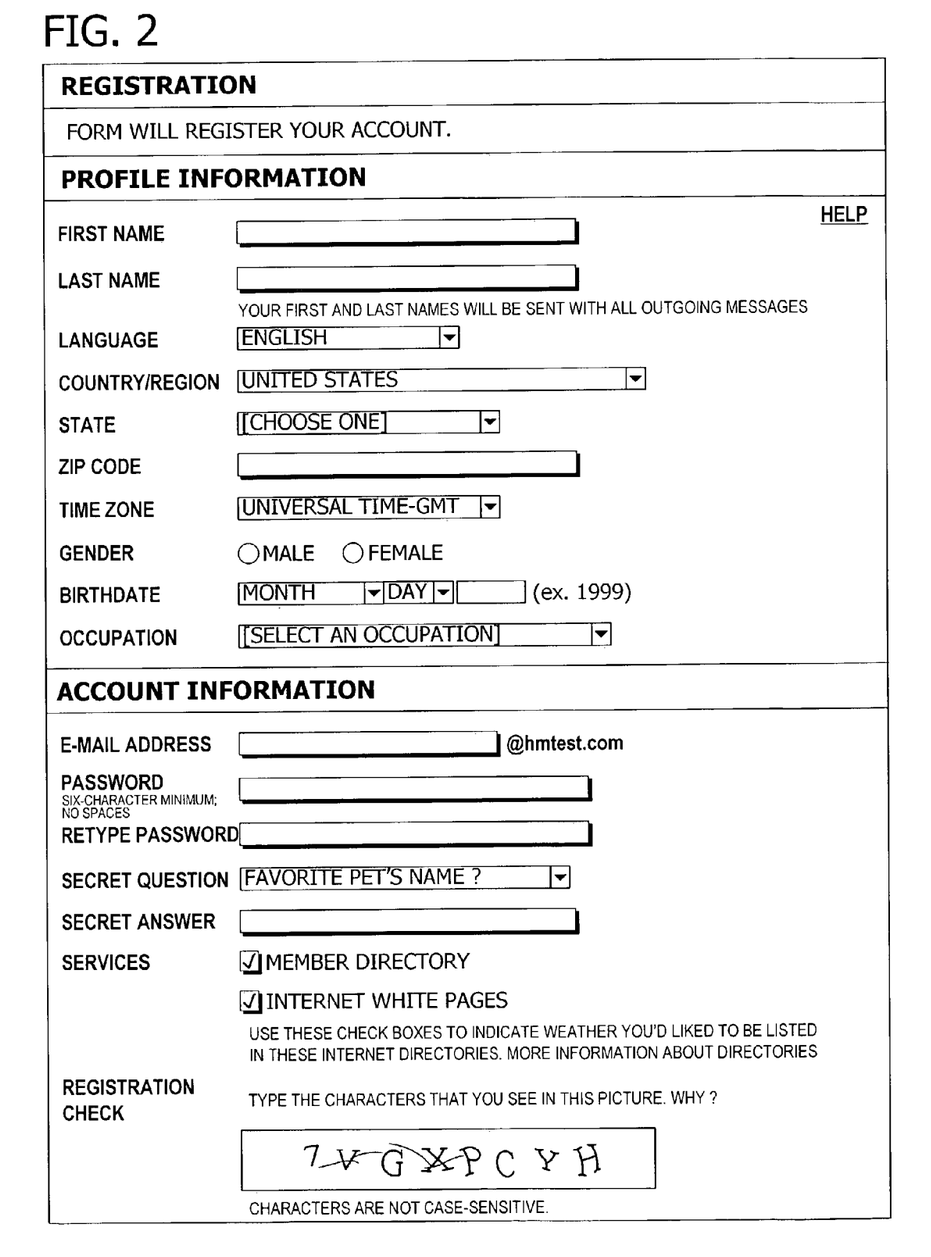
FIG. 2 is an exemplary screen display illustrating a registration page, including an image challenge, according to one embodiment of the invention.

In one embodiment, the invention provides techniques for changing the way web pages are presented to the user to prevent scripts, as well as associated back-end techniques for a complete end-to-end solution. FIG. 2 illustrates the invention in the context of preventing script attacks on registering web sites. In particular, FIG. 2 is an exemplary screen display illustrating a registration page for a web service, such as a multi-site authentication service, a web-based e-mail service, or another service requiring user registration.

As shown in the FIG. 2 screen display, the web site presents the user with a graphical image as part of the registration process. The image in this instance contains a string or sequence of random characters that have been visually cluttered, obscured, or otherwise altered to inhibit character recognition by unauthorized client computer 168. For example, the invention employs random noise, like in the bellow image, to obscure the characters. Moreover, the image generation contemplates "tuning" the challenge to adjust its difficulty (e.g., alter the amount of skew, connecting lines, line thickness, etc.). To continue the registration process, the user must repeat the string of textual characters in an accompanying text box. If the user (or unauthorized client 168) provides an incorrect solution to this test, the server denies access, which terminates the registration process. In this manner, a script cannot be used against the registration page.

The image test shown in FIG. 2 presents an obstacle to vision-impaired users. Advantageously, the present invention provides the alternative audio challenge of FIG. 3 for use in connection with the registration page of FIG. 2. The user can elect to bypass the image for an audible test. In this embodiment, client computer 162 plays, or reads aloud, an alternative string of random characters. The audible character string advantageously requires a different response than the textual character string because at least one character is different between the two. By providing different characters (rather than merely reading the textual challenge aloud), the invention further inhibits the ability of the unauthorized client computer 168 to launch a successful script attack. To continue the registration process, the user must repeat the string of audible characters in an accompanying text box. As before, if the user (or unauthorized client 168) provides an incorrect solution to this test, the server denies access, which terminates the registration process.

Figure 3:
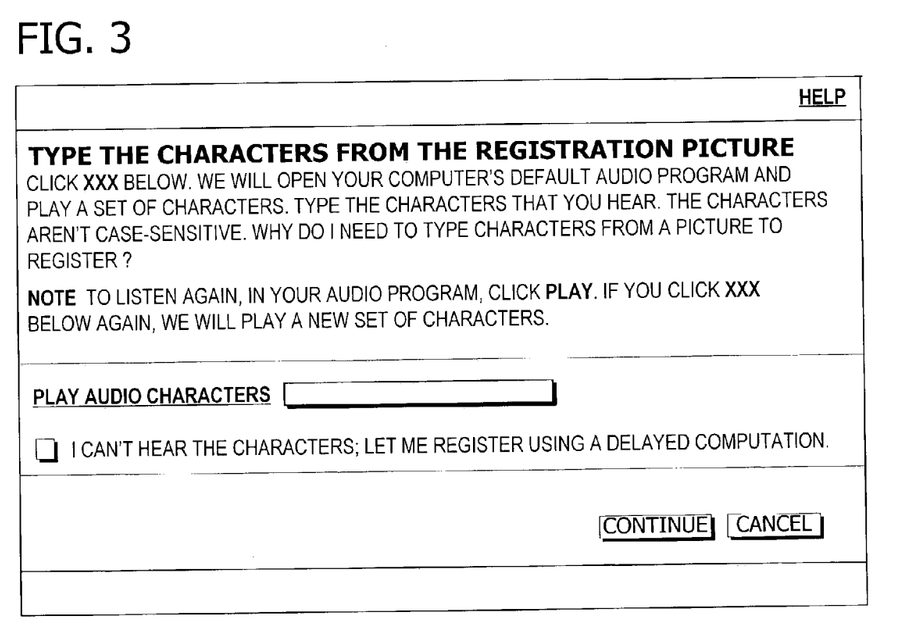
FIG. 3 is an exemplary screen display illustrating an alternative audio challenge for use in connection with the registration page of FIG. 2.

In one embodiment of the present invention, server 170 renders the audio challenge to the user by opening the default audio program of client computer 162 to play the character string for the user. The JAWS® screen reader software, available from Freedom Scientific of St. Petersburg, Fla., is suitable for playing the audible character string. The audible character string is not visible to the user but included, for example, as embedded text in the web page. The web page will typically consist of a Hypertext Markup Language (HTML) or other suitable markup language file with associated files for graphics and non-malicious scripts. In this instance, server 170 renders the audible character strings by specifying an alternate text attribute (e.g., ALT=?) in the markup language. Those skilled in the art are familiar with the use of the ALT characteristic, primarily in connection with text-based browsers.

The client computer 162 plays the audible character string in a selected language independent of the textual character string of the image test. In other words, the invention localizes the language for the audio challenge. The user need only visually recognize the textual characters whereas the user must be able to understand the audible characters. The browser program can be used to specify the desired language of the user (e.g., via a Hypertext Transfer Protocol (HTTP) header) or the user can specify the desired language (e.g., via an entry on the registration page).

Figure 4:
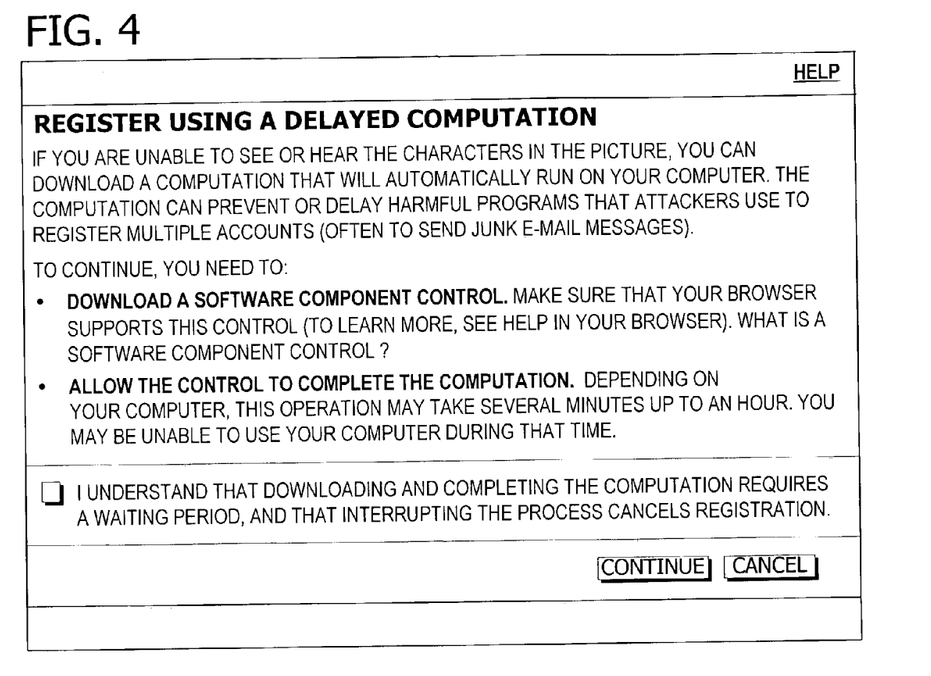
FIG. 4 is an exemplary screen display illustrating a request for an alternative computational challenge for use in connection with the registration page of FIG. 2.
Figure 5:
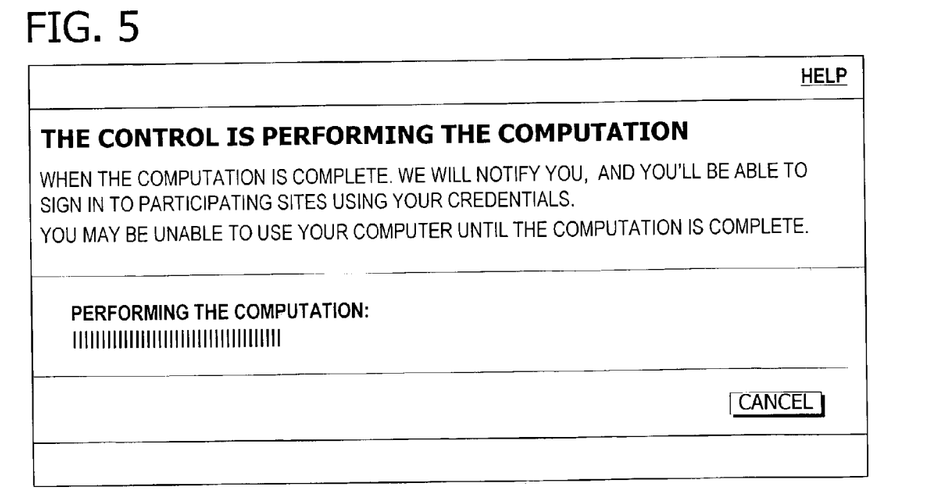
FIG. 5 is an exemplary screen display illustrating operation of the alternative computational challenge of FIG. 4.

Referring now to FIGS. 4 and 5, the present invention provides yet another alternative challenge. In this instance, the user may elect to have client computer 162 execute a computational puzzle. The user first downloads a reusable software component (e.g., an ActiveX® control) to perform a computation on client computer 162. Depending on the computer's processing ability, client computer 162 takes a fairly lengthy time (e.g., several minutes) to solve the computation. This prevents script attacks because an automated registration process for a large number of new accounts cannot afford the delays caused by the lengthy computation time. In other words, the computational challenge or puzzle, which is a problem known to take some significant CPU time to resolve, and is trivial to verify when it is correctly resolved, makes an automated registration process too costly for hackers.

As an example, the computational challenge guarantees with a relatively high probability that the puzzle cannot be solved in less than a configurable amount of time (e.g., 10 minutes) by a computer using a highly efficient implementation of the puzzle algorithm. Also, the computational challenge gives users reasonable visible feedback about the progress of the operation.

It is to be understood that any combination of the image, audio, and computational challenges provides significant improvement in preventing script attacks from succeeding.

Figure 6:
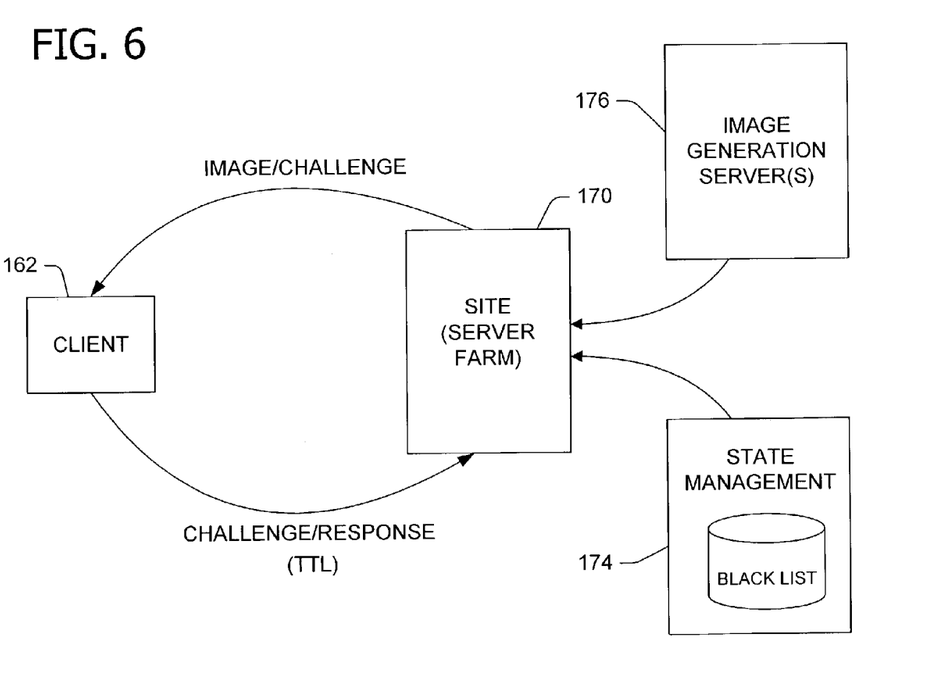
FIG. 6 is a block diagram of a computer network implementing the image challenge of FIG. 2 according to one embodiment of the invention.
Figure 7:
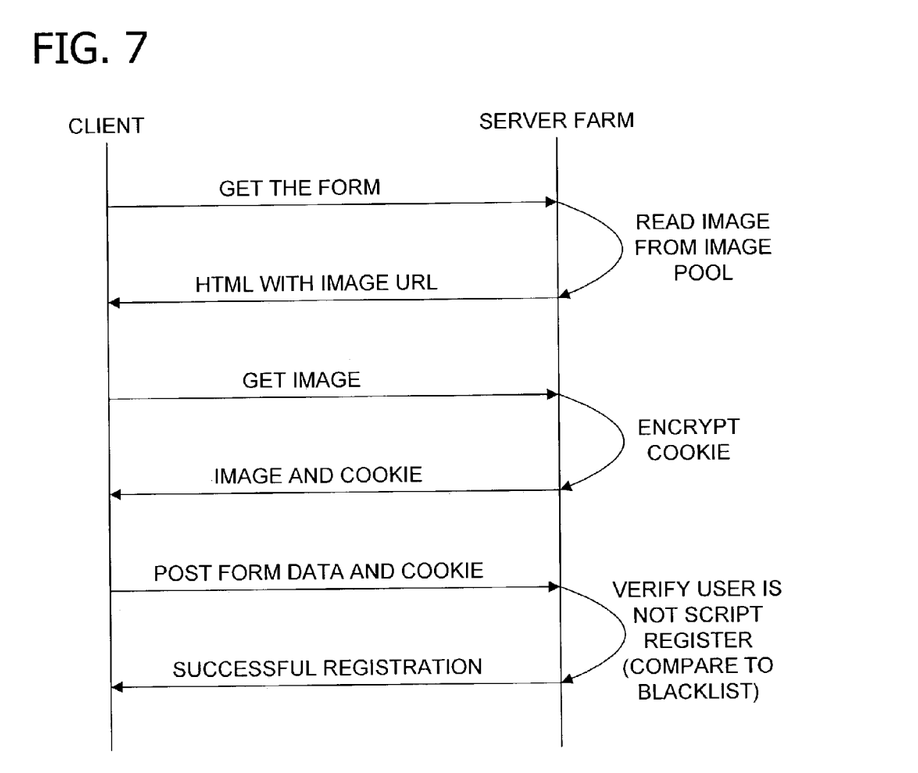
FIG. 7 is an exemplary flow diagram illustrating interaction between a client and server of FIG. 1.

Referring now to FIGS. 6 and 7, the server 170 maintains a "black list" in an associated memory 174. The memory 174 represents, for example, a SQL database, a persistent store, or any one many known means for storing information. For example, database 172 embodies the memory 174. In the illustrated embodiment, the black list, or state management, database 174 stores successful responses previously submitted by the user. Server 170 first renders a character string to the user for the image test. One or more image generation servers 176 coupled to server 170 generate a random character string image every 10 seconds, for example. Further to the example, if the servers 176 cache five images, the life of each image for use in a textual challenge is approximately 100 seconds. Advantageously, server 170 can deliver the same image to multiple registrants in this embodiment because, as described below, it contains a time stamp, which allows the challenge to be invalidated after a period of time.

It is further contemplated that server 170 as shown in FIG. 6 may be one or more server computers (i.e., a server farm). Image generation servers 176 are shown separately for convenience but may be part of the server farm shown at server 170. As before, black list database 174, which is shown as a single storage unit separate from server 170, may be one or more memories contained within or separate from server 170 in other embodiments of the invention.

As shown in FIG. 7, client computer 162 requests the registration form from server 170. In return, server 170 replies with an HTML document containing a uniform resource locator (URL) for the image. Client 162 then gets the image along with a block of data (e.g., a cookie). The user posts data for the registration form and returns the cookie to server 170. In one embodiment of the invention, the cookie includes a correct solution to the challenge (i.e., the string of characters shown in the image) and a time stamp. In addition, the cookie may also contain the user's unique member name. The cookie takes the following form, for example: solution=x & int=y & ns=z & date=t & mn=u where int=interface=registration login, ns=namespace, and mn=member name. Assuming the response received from the user is correct, server 170 stores the returned cookie to the black list database 174 and notifies the user of the successful registration. Server 170 then denies registration of new accounts when the client (i.e., unauthorized client 168) returns a response that matches a past successful response stored in black list database 174. Similarly, the computational challenge embeds the member name and once registration is complete, server 170 checks that the submitted registration member name is the same as the one in the challenge. In this manner, the invention prevents replay attacks. It is to be understood that the blocks of data may take various forms including cookies, form fields, query strings, and so forth.

One benefit of the methods described herein is the prevention of replay attacks. In a client-server configuration typical for web sites, server 170 sends the image to the user via client 162 along with a cryptographic object. The cryptographic object is, for example, an encryption or hash of the correct response. A user responds by presenting server 170 with both the clear text response to the image test as well as the cryptographic object initially presented by server 170. Server 170 then verifies that the information submitted by the user matches the required response. By encoding the answer to a challenge in a cookie, form field, or query string (either encrypted or hashed) that is returned with the response to the challenge, the invention allows for essentially stateless operation. These back-end improvements of the illustrated embodiment permit the server issuing a challenge to be different from the server that evaluates the correctness of the response.

With respect to encryption, those skilled in the art are familiar with various techniques, such as Triple DES and the like. For example, a key K may be used in which the encrypted response takes that form of $D_K(E_K(x))$=response where x=correct response and $E_K(X)$=cookie. In the alternative, the present invention employs a cryptographic hash such as SHA-1 or MD-5 where the block of data has the form of h(x) and where x=correct response.

To mitigate the ability of a malicious or otherwise unauthorized user to reuse the same challenge and response multiple times, each successful response only survives for a predetermined time-to-live (TTL) period. According to one embodiment of the invention, server 170 includes a time stamp in the cryptographic response when encrypting the challenge. When the user submits the response/challenge pair, server 170 checks both the response and how long the user took to respond. Server 170 then rejects challenges with an expired TTL.

As described above, one embodiment of the present invention involves the use of a black list state management technique. Storing successful responses in black list database 174 is particularly useful when done in connection with the TTL technique. If the TTL period is too short, the human user may not have sufficient time to respond to the challenge. On the other hand, an attacker can still inflict significant damage by re-using the challenge/response pair for the duration of the TTL, particularly if the period is lengthy. To prevent such attacks, this embodiment of server 170 maintains a list of all challenges associated with successful transactions submitted to the site. When the user submits a challenge/response to the site and it is associated with a good transaction, server 170 keeps the information on site for at least the duration of the TTL. Following expiration of the TTL period, server 170 can delete the cookie or other block of data (including the challenge/response) from black list database 174. When another user submits a subsequent challenge/response, server 170 checks the new information against the black list of database 174. If server 170 finds the challenge/response in black list database 174, it simply rejects the transaction as a replay transaction. Usually state management techniques are vulnerable to denial of service attacks when the system is forced to maintain too much state. The technique described herein, however, is protected against such attacks because the black list can only grow with successful transactions, which a repetitive script cannot emulate.

Another embodiment of the invention additionally protects the network from dictionary/brute force attacks. One of the methods of attacks against passwords is the use of dictionary attacks against web sites accepting the credential. In this instance, an attacker runs a script that attempts to guess the password of a user by very frequent and rapid attempts to guess the password. Either blocking the account after a set number of unsuccessful login attempts or by introducing ever increasing blackout periods between login attempts to slow down and thereby prevent such attacks. According to the invention, server 170 also presents an image challenge to the user to reduce the risk of a denial of service attack (where a legitimate user cannot use an account under attack). In particular, server 170 requires the user to enter the text in a scrambled image, in addition to providing the password, after a specified number of failed attempts to attack an account. This will prevent scripts from trying to guess the password, while not interfering with the regular use of the account. This technique mitigates the risks of dictionary and brute force attacks, as well as denial of service attacks, and limits their effectiveness.

Chat rooms are web applications that provide a data communication channel linking computers and permitting users to "chat" by sending text messages to one another in real time. Often, many Internet users congregate in a chat room. Unfortunately, malicious users run scripts against chat rooms to enter a room, issue a commercial message, and then move to another room. The malicious users employ this attack to obtain free advertising. According to one embodiment of the present invention, server 170 renders challenges at regular intervals in the form of, for example, scrambled images when a user is seen interacting with a large number of chat rooms with a higher frequency than humanly possible. In this manner, the invention prevents scripts from running.

Most large web sites have a relatively large number of stateless web servers, which sit behind a load balancing arrangement. The state management techniques described herein employ a central state management server. A single central database in the backend to which all web servers connect achieves the state management. The solution is effective because of the following: a) the database need not be very large and it has a very simple schema (hence, it is very efficient and fast, being able to sustain high loads); b) the system does not need any back-up because of the black list arrangement (the worst that can happen if the data is lost is that some challenges are replayed, which is acceptable; and c) the system does not need to be a single point of failure (being small and simple, such a database can be brought back on line very quickly in the event of a failure and for the duration of the outage the risk of replay attacks due to lack of state management can be tolerated).

Figure 8:
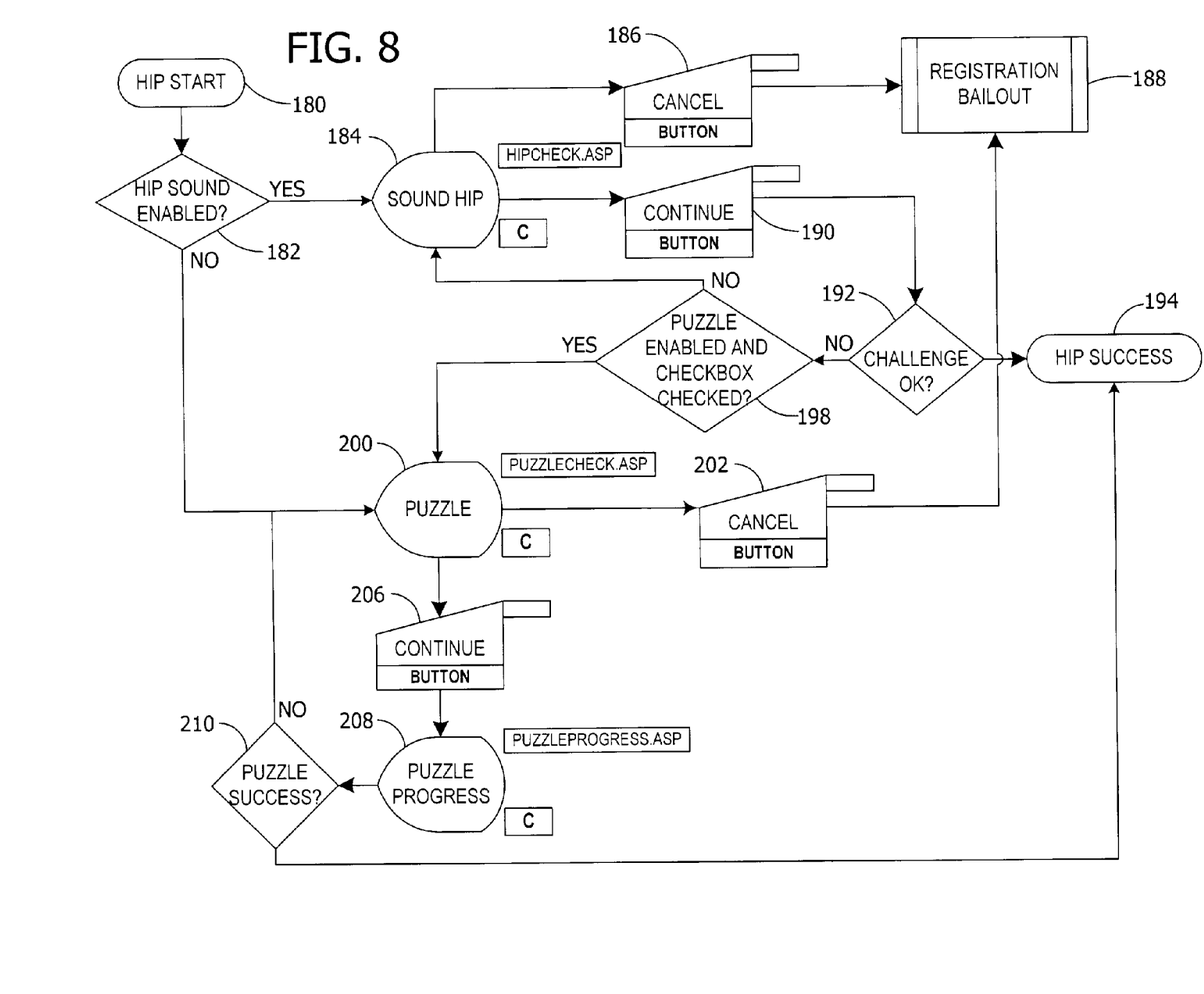
FIG. 8 is an exemplary flow diagram illustrating process flow according to one embodiment of the invention.

Referring now to FIG. 8, one embodiment of the invention for providing a human interaction proof (HIP) to distinguish between humans and machines interaction is shown by way of an exemplary flow diagram. Beginning at 180, the process immediately proceeds to 182 to determine if the audio challenge is enabled as an alternative to the image challenge already described above. If so, process flows to conduct the audio test or challenge at 184. Depending on the user's decision to cancel or continue, server 170 either cancels at 186 and then ends the registration process at 188 or continues at 190 and then determines the status of the audio challenge at 192. If the user responds correctly to the audio challenge, server 170 determines at 194 that the HIP was successful. Otherwise, the process continues at 198 for determining whether or not server 170 should render the computational puzzle. Server 170 renders the puzzle at 200. As before, server 170 either cancels at 202 and then ends the registration process at 188 or continues at 206 and then determines the status of the computational puzzle challenge at 208. If client 162 solves the computational puzzle within, for example, a predetermined range of time, server 170 determines at 210 that the HIP was successful and proceeds to 194. Note that process flow, proceeds to the puzzle challenge at 200 if the HIP audio challenge is not enabled at 182.

In one embodiment of the invention, server 170 renders a HIP generated in accordance with the teachings of commonly assigned application Ser. No. 10/373,926, entitled "Improved Content Alteration for Prevention of Unauthorized Scripts" and filed concurrently herewith, the entire disclosure of which is incorporated herein by reference.

Figure 9:
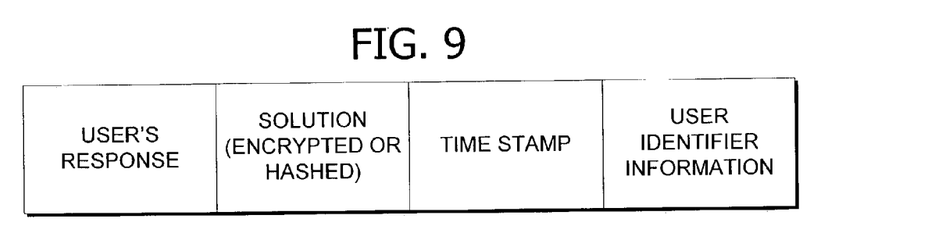
FIG. 9 is an exemplary data structure generated in accordance with the invention.

FIG. 9 illustrates an exemplary data structure according to the invention. In this instance, the data structure contains the information returned from the client 162 in response to the HIP challenge. In addition to the user's response, a block of data (e.g., a cookie) includes a correct solution to the challenge (e.g., the string of characters shown in the image) and a time stamp. In one embodiment, the correct solution is either encrypted or hashed. Likewise, the entire block of data may be encrypted. In this instance, affiliated servers 166 each have a key. In addition, the block of data may also contain the user's unique member name. In one embodiment, the block of data is a cookie taking, for example, the following form: solution=x & int=y & ns=z & date=t & mn=u where int=interface=registration login, ns=namespace, and mn=member name.

Figure 10:
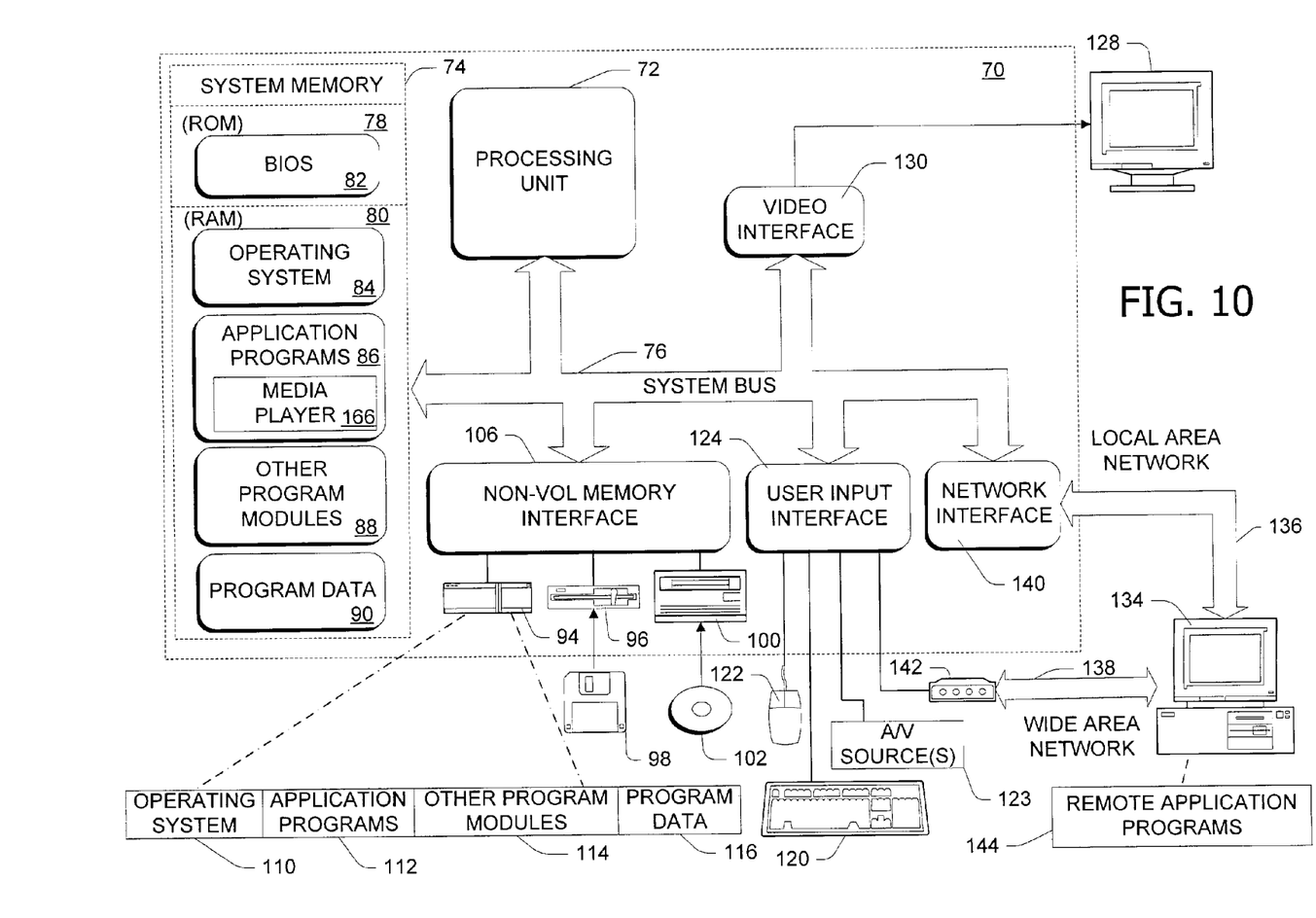
FIG. 10 is a block diagram illustrating components of a computer for use with the present invention.

FIG. 10 shows one example of a general purpose computing device in the form of a computer 70. In one embodiment of the invention, a computer such as the computer 70 is suitable for use in client computer system 162 (or unauthorized client computer system 168), server 170, or any of affiliate servers 166.

In the illustrated embodiments, computer 70 has one or more processors or processing units 72 and a system memory 74. In the illustrated embodiment, a system bus 76 couples various system components including the system memory 74 to the processors 72. The bus 76 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA)

bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 70 typically has at least some form of computer readable media. Computer readable media, which include both volatile and nonvolatile media, removable and non-removable media, may be any available medium that can be accessed by computer 70. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by computer 70. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of the any of the above are also included within the scope of computer readable media.

The system memory 74 includes computer storage media in the form of removable and/or non-removable, volatile and/or nonvolatile memory. In the illustrated embodiment, system memory 74 includes read only memory (ROM) 78 and random access memory (RAM) 80. A basic input/output system 82 (BIOS), containing the basic routines that help to transfer information between elements within computer 70, such as during startup, is typically stored in ROM 78. The RAM 80 typically contains data and/or program modules that are immediately accessible to and/or presently being operated on by processing unit 72. By way of example, and not limitation, FIG. 10 illustrates operating system 84, application programs 86, other program modules 88, and program data 90.

The computer 70 may also include other removable/non-removable, volatile/nonvolatile computer storage media. For example, FIG. 10 illustrates a hard disk drive 94 that reads from or writes to non-removable, nonvolatile magnetic media. FIG. 10 also shows a magnetic disk drive 96 that reads from or writes to a removable, nonvolatile magnetic disk 98, and an optical disk drive 100 that reads from or writes to a removable, nonvolatile optical disk 102 such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 94, and magnetic disk drive 96 and optical disk drive 100 are typically connected to the system bus 76 by a non-volatile memory interface, such as interface 106.

The drives or other mass storage devices and their associated computer storage media discussed above and illustrated in FIG. 10, provide storage of computer readable instructions, data structures, program modules and other data for the computer 70. In FIG. 10, for example, hard disk drive 94 is illustrated as storing operating system 110, application programs 112, other program modules 114, and program data 116. Note that these components can either be the same as or different from operating system 84, application programs 86, other program modules 88, and program data 90. Operating system 110, application programs 112, other program modules 114, and program data 116 are given different numbers here to illustrate that, at a minimum, they are different copies.

A user may enter commands and information into computer 70 through input devices or user interface selection devices such as a keyboard 120 and a pointing device 122 (e.g., a mouse, trackball, pen, or touch pad). Other input devices (not shown) may include a microphone, joystick, game pad, satellite dish, scanner, or the like. These and other input devices are connected to processing unit 72 through a user input interface 124 that is coupled to system bus 76, but may be connected by other interface and bus structures, such as a parallel port, game port, or a universal serial bus (USB). A monitor 128 or other type of display device is also connected to system bus 76 via an interface, such as a video interface 130. In addition to the monitor 128, computers often include other peripheral output devices (not shown) such as a printer and speakers, which may be connected through an output peripheral interface (not shown).

The computer 70 may operate in a networked environment using logical connections to one or more remote computers, such as a remote computer 134. The remote computer 134 may be a personal computer, a server, a router, a network PC, a peer device or other common network node, and typically includes many or all of the elements described above relative to computer 70. The logical connections depicted in FIG. 10 include a local area network (LAN) 136 and a wide area network (WAN) 138, but may also include other networks. Such networking environments are commonplace in offices, enterprise-wide computer networks, intranets, and global computer networks (e.g., the Internet).

When used in a local area networking environment, computer 70 is connected to the LAN 136 through a network interface or adapter 140. When used in a wide area networking environment, computer 70 typically includes a modem 142 or other means for establishing communications over the WAN 138, such as the Internet. The modem 142, which may be internal or external, is connected to system bus 76 via the user input interface 124, or other appropriate mechanism. In a networked environment, program modules depicted relative to computer 70, or portions thereof, may be stored in a remote memory storage device (not shown). By way of example, and not limitation, FIG. 10 illustrates remote application programs 144 as residing on the memory device. It will be appreciated that the network connections shown are exemplary and other means of establishing a communications link between the computers may be used.

Generally, the data processors of computer 70 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described herein in conjunction with a microprocessor or other data processor. The invention also includes the computer itself when programmed according to the methods and techniques described below.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 70, the invention is operational with numerous other general purpose or special purpose computing system environments or configurations. The computing system environment is not intended to suggest any limitation as to the scope of use or functionality of the invention. Moreover, the computing system environment should not be interpreted as having any dependency or requirement relating to any one or combination of components illustrated in the exemplary operating environment. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics including cell phones, network PCs, minicomputers, mainframe computers, distributed computing environments that include any of the above systems or devices, and the like.

The invention may be described in the general context of computer-executable instructions, such as program modules, executed by one or more computers or other devices. Generally, program modules include, but are not limited to, routines, programs, objects, components, and data structures that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

In operation, computer 70 executes computer-executable instructions such as those illustrated in the drawings to render one or more Turing-type tests to a user for distinguishing the user from a machine when the user requests access to a server (e.g., server 166). By storing a correct solution to the test in a block of data and sending the block together with the test, the invention provides stateless operation. Moreover, maintaining a black list database of previously used correct responses prevents replay attacks. Computer 70 further executes computer-executable instructions for rendering combinations of alternative tests, such as visually altered textual character strings, audible character strings, and computational puzzles.

Information in this document, including uniform resource locator and other Internet Web site references, is subject to change without notice. Unless otherwise noted, the example companies, organizations, products, domain names, e-mail addresses, logos, people, places and events depicted herein are fictitious, and no association with any real company, organization, product, domain name, e-mail address, logo, person, place or event is intended or should be inferred.

When introducing elements of the present invention or the embodiments thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above constructions and methods without departing from the scope of the invention, it is intended that all matter contained in the above description and shown in the accompanying drawings shall be interpreted as illustrative and not in a limiting sense.

What is claimed is:

1. A method of preventing automated access to a service provided by a server coupled to a data communication network, said method comprising:
    delivering a first test to a client coupled to the data communication network for rendering to a user in response to the user requesting access to the service via the client, said first test being a human interaction proof test;
    delivering a second test to the client as an alternative to the first test, said second test being a human interaction proof test;
    delivering a third test to the client as an alternative to the first and second tests, said third test including a computational puzzle to be solved by the client, said first, second, and third tests each having a different correct solution, at least one of said first, second, and third tests being elected by the user;
    receiving, via the client, a response to the at least one of the tests elected by the user; and
    granting access to the service via the client if the received response is the correct solution to the at least one of the tests elected by the user.

2. The method of claim 1 wherein the first test includes a human-readable textual string of characters to be read by the user, said textual string of characters being visually altered to inhibit computerized character recognition, and wherein the user responds to the first test by repeating the textual string of characters via an input device of the client.

3. The method of claim 2 further comprising varying the visual alteration of the textual string of characters to further inhibit computerized character recognition.

4. The method of claim 2 wherein the second test is an audible string of characters to be heard by the user, said audible string of characters including at least one character different than the textual string of characters of the first test, and wherein the user responds to the second test by repeating the audible string of characters via an input device of the client.

5. The method of claim 4 wherein the client operates a browser program configured to permit the user to communicate on the data communication network and wherein delivering the second test comprises embedding text readable by the browser program and representative of the audible string of characters.

6. The method of claim 5 wherein embedding the text comprises specifying an alternate text attribute in a markup language.

7. The method of claim 4 wherein the audible string of characters to be heard by the user in the second test is in a selected language independent of the textual string of characters to be read by the user in the first test.

8. The method of claim 7 wherein the client operates a browser program configured to permit the user to communicate on the data communication network and wherein the browser program specifies the selected language.

9. The method of claim 7 further comprising receiving, in response to a registration page, a request from the user that the second test be rendered in the selected language.

10. The method of claim 1 wherein said computational puzzle included in said third test is to be solved by the client in a manner incurring a computational cost within a predetermined range.

11. The method of claim 1 further comprising storing the received response in a memory if the received response is the correct solution to the at least one of the tests elected by the user and denying access to the server if a subsequent response received via the client matches the stored received response.

12. The method of claim 11 further comprising deleting the stored received response from the memory after a predetermined time-to-live period.

13. The method of claim 1 further comprising sending a block of data from the server to the client for return by the client with the response.

14. The method of claim 13 further comprising encrypting the block of data.

15. The method of claim 13 wherein the block of data includes a time stamp.

16. The method of claim 13 wherein the block of data includes a unique login identifier associated with the user.

17. The method of claim 13 wherein the block of data includes the correct solution to at least one of the tests for comparison to the received response and further comprising encrypting the correct solution.

18. The method of claim 13 wherein the block of data includes the correct solution to at least one of the tests for comparison to the received response and further comprising hashing the correct solution.

19. The method of claim 13 wherein the block of data is selected from the following: a cookie; a form field; and a query string.

20. The method of claim 1 wherein the first and second tests are selected from the following: a human-readable textual string of characters to be read by the user and repeated by the user via an input device, said textual string of characters being visually altered to inhibit computerized character recognition; and an audible string of characters to be heard by the user and repeated by the user via an input device, said audible string of characters including at least one character different than the textual string of characters of the first test.

21. The method of claim 1 wherein the server is a web server and the data communication network is the Internet.

22. One or more computer-readable storage media having computer-executable instructions for performing the method of claim 1.

23. A method of conducting a Turing test for a user requesting access to a service provided by a server coupled to a data communication network, said user requesting the service via a client computer system also coupled to the data communication network, said method comprising:

delivering a first test to the client computer system, said first test comprising a human-readable textual string of characters to be read by the user, said textual string of characters being visually altered to inhibit computerized character recognition;

delivering a second test to the client computer system as an alternative to the first test, said second test comprising an audible string of characters to be heard by the user;

delivering a third test to the client computer system as an alternative to the first and second tests, said third test comprising a computational puzzle configured to be executed by the client computer system in a manner requiring a pre-defined minimum amount of time, said first, second, and third tests each having different correct solutions;

enabling the user to elect between the first, second, and third tests;

receiving a response to the elected test and providing access based on the received response.

24. The method of claim 23 further comprising storing the response received in a memory and denying access to the server if a subsequent response received via the client matches the stored response.

25. The method of claim 24 further comprising deleting the stored response from the memory after a predetermined time-to-live period.

26. The method of claim 23 further comprising sending a block of data to the client for return by the client computer system with the response, said block of data including the correct solution to at least one of the tests for comparison to the received response.

27. The method of claim 23 further comprising varying the visual alteration of the textual string of characters to further inhibit computerized character recognition.

28. One or more computer-readable storage media having computer-executable instructions for performing the method of claim 23.

29. A method of preventing automated access to a service, said method comprising:

delivering a first human interaction proof challenge and a second human interaction proof challenge to a client coupled to a data communication network in response to a user requesting a service to be provided via the network, said first and second challenges each having a different correct solution;

requesting that the user elect the first or the second challenge;

enabling the user to elect a third challenge as an alternative to the first and second challenges, said third challenge including a computational puzzle to be solved by the client;

receiving via the client a response to the elected challenge;

storing information representative of one or more previously used challenges;

comparing the received response to the stored information; and granting access to the service via the client if the received response is the correct solution to the challenge elected by the user unless the received response corresponds to the stored information.

30. The method of claim 29 further comprising deleting the stored information representative of previously used challenges after a predetermined time-to-live period.

31. The method of claim 29 further comprising sending a block of data to the client for return by the client with the response from the user, said block of data being stored after being returned with the response.

32. The method of claim 31 further comprising encrypting the block of data.

33. The method of claim 31 wherein the block of data includes a time stamp.

34. The method of claim 31 wherein the block of data includes a unique login identifier associated with the user.

35. The method of claim 31 wherein the block of data includes the elected challenge for comparison to the received response and further comprising hashing the correct solution for the elected challenge in the block of data.

36. The method of claim 31 wherein the block of data includes the elected challenge for comparison to the received response and further comprising encrypting the correct solution for the elected challenge in the block of data.

37. The method of claim 31 wherein the block of data is selected from the following: a cookie; a form field; and a query string.

38. The method of claim 29 wherein the first challenge delivered to the user comprises a human-readable textual string of characters, said textual string of characters being visually altered to inhibit computerized character recognition.

39. The method of claim 38 further comprising varying the visual alteration of the textual string of characters to further inhibit computerized character recognition.

40. The method of claim 38 wherein the second challenge delivered to the user comprises an audible string of characters.

41. The method of claim 29 wherein the computational puzzle is to be solved by the client in a manner incurring a computational cost within a predetermined range.

42. The method of claim 29 wherein the server is a web server and the data communication network is the Internet.

43. One or more computer-readable storage media having computer-executable instructions for performing the method of claim 29.

44. A method of preventing automated access to a service provided by a server coupled to a data communication network, said method comprising:
  delivering at least three tests for identifying unauthorized scripts, said tests being delivered to a client coupled to the data communication network in response to a user requesting access to the service via the network, said tests each having different correct solutions, and at least one of said tests being elected by the user, said tests being selected from a group consisting of: a human-readable textual string of characters to be read by the user, wherein the textual string of characters is visually altered to inhibit computerized character recognition; an audible string of characters to be heard by the user; and a computational puzzle to be solved by the client;
  sending, to the client, a block of data representative of the correct solutions to the tests together with the tests, said block of data being returned with a response to the elected test from the user;
  receiving the response and the block of data via the network;
  determining whether the received response is valid based on the received response and the received block of data; and
  granting access to the service if the received response is valid.

45. The method of claim 44 further comprising encrypting the block of data.

46. The method of claim 44 wherein the block of data includes a time stamp.

47. The method of claim 44 wherein the block of data includes a unique login identifier associated with the user.

48. The method of claim 44 further comprising encrypting the correct solutions stored in the block of data.

49. The method of claim 44 further comprising hashing the correct solutions stored in the block of data.

50. The method of claim 44 wherein the block of data is selected from the following: a cookie; a form field; and a query string.

51. The method of claim 44 further comprising varying the visual alteration of the textual string of characters to further inhibit computerized character recognition.

52. The method of claim 44 wherein the client operates a browser program configured to permit the user to communicate on the data communication network and wherein delivering the audible string of characters test comprises embedding text readable by the browser program and representative of the audible string of characters.

53. The method of claim 52 wherein embedding the text comprises specifying an alternate text attribute in a markup language.

54. The method of claim 44 further comprising storing information representative of the received response if the received response is valid and denying access to the service if a subsequent response received via the network corresponds to the stored information.

55. The method of claim 54 further comprising deleting the stored information after a predetermined time-to-live period.

56. The method of claim 44 further comprising periodically changing at least one of the plurality of tests.

57. The method of claim 44 wherein the server is a web server and the data communication network is the Internet.

58. The method of claim 44 wherein delivering the tests comprises delivering the tests to the client by a first server coupled to the data communication network and wherein receiving the response and the block of data comprises receiving the response and the block of data by a second server also coupled to the data communication network.

59. One or more computer-readable storage media having computer-executable instructions for performing the method of claim 44.

60. A system for preventing unauthorized access to a service provided via a data communication network comprising:
  a first server coupled to the network, said first server delivering at least three challenges each having different correct solutions to a client also coupled to the network in response to the client requesting access to the service, said tests being selected from a group consisting of: a human-readable textual string of characters to be read by a user, wherein the textual string of characters is visually altered to inhibit computerized character recognition; an audible string of characters to be heard by the user; and a computational puzzle to be solved by the client, said first server sending a block of data to the client together with each of the challenges, said block of data containing information representative of the correct solutions to the challenges; and
  a second server coupled to the network, said second server receiving, from the client, a response to at least one of the challenges elected by the client, said second server further receiving the block of data via the client for determining whether the received response is valid before granting access by the client to the service.

* * * * *

UNITED STATES PATENT AND TRADEMARK OFFICE
CERTIFICATE OF CORRECTION

PATENT NO. : 7,606,915 B1  Page 1 of 1
APPLICATION NO. : 10/374036
DATED : October 20, 2009
INVENTOR(S) : Calinov et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1108 days.

Signed and Sealed this

Twelfth Day of October, 2010

David J. Kappos
*Director of the United States Patent and Trademark Office*